US 012540827B2

(12) United States Patent
Fowe et al.

(10) Patent No.: US 12,540,827 B2
(45) Date of Patent: Feb. 3, 2026

(54) TRAFFIC PREDICTION AND ROUTING USING TRAIN MOVEMENT PATTERNS

(71) Applicant: HERE Global B.V., Eindhoven (NL)

(72) Inventors: James Adeyemi Fowe, Evanston, IL (US); Bruce Bernhardt, Wauconda, IL (US)

(73) Assignee: HERE Global B.V., Eindhoven (NL)

( * ) Notice: Subject to any disclaimer, the term of this patent is extended or adjusted under 35 U.S.C. 154(b) by 441 days.

(21) Appl. No.: 17/556,525

(22) Filed: Dec. 20, 2021

(65) Prior Publication Data

US 2023/0194285 A1    Jun. 22, 2023

(51) Int. Cl.
*G01C 21/34* (2006.01)
*G01C 21/36* (2006.01)
*G06N 3/02* (2006.01)

(52) U.S. Cl.
CPC ..... *G01C 21/3492* (2013.01); *G01C 21/3446* (2013.01); *G01C 21/3676* (2013.01); *G06N 3/02* (2013.01)

(58) Field of Classification Search
CPC ............ G01C 21/3492; G01C 21/3446; G01C 21/3676; G06N 3/02
USPC ........................................................ 701/414
See application file for complete search history.

(56) References Cited

U.S. PATENT DOCUMENTS

| | | | | |
|---|---|---|---|---|
| 6,751,549 B1 * | 6/2004 | Kozak | ................ | G01C 21/3461 701/410 |
| 10,768,001 B2 * | 9/2020 | Ghannam | .......... | G01C 21/3415 |
| 11,276,316 B1 * | 3/2022 | Hayward | ................ | H04W 4/06 |
| 11,377,108 B2 * | 7/2022 | Ravichandran | ........ | B60K 35/00 |
| 11,397,091 B2 * | 7/2022 | Singer | ................ | G01C 21/3438 |
| 11,967,006 B2 * | 4/2024 | Liu | ...................... | G08G 1/0969 |
| 2008/0177460 A1 | 7/2008 | Blackwood et al. | | |
| 2014/0266798 A1 | 9/2014 | Witte et al. | | |

(Continued)

FOREIGN PATENT DOCUMENTS

| | | |
|---|---|---|
| CN | 110599768 A | 12/2019 |
| EP | 1742188 A2 | 1/2007 |
| WO | 2018151676 A1 | 8/2018 |

OTHER PUBLICATIONS

Jiang, Learning heterogeneous traffic patterns for travel time prediction of bus journey, Science Direct, 2019 (Year: 2019).*

(Continued)

*Primary Examiner* — Matthew Ell
(74) *Attorney, Agent, or Firm* — Lempia Summerfield Katz LLC

(57) ABSTRACT

A method and apparatus for calculating an estimated travel time and a method and apparatus for defining a model configured to estimate a travel time are provided. The method for estimating a travel time includes obtaining a movement pattern for a train, determining one or more predicted times when the train will be present at a train crossing where a road path and a train path intersect using the movement pattern, obtaining vehicle historical data including an average time for a vehicle to travel one or more road segments adjoining the train crossing, obtaining a start time, and calculating the travel time for the one or more road segments based on the vehicle historical data, the start time, and the predicted time when the train will be present at the train crossing.

19 Claims, 6 Drawing Sheets

(56) References Cited

U.S. PATENT DOCUMENTS

| | | | |
|---|---|---|---|
| 2016/0076905 A1* | 3/2016 | Broadbent | G01C 21/3697 |
| | | | 701/414 |
| 2018/0284772 A1* | 10/2018 | Ravichandran | B60W 10/20 |
| 2019/0152450 A1 | 5/2019 | Weber et al. | |
| 2021/0158447 A1* | 5/2021 | Simpson | G06Q 30/0269 |
| 2022/0034664 A1* | 2/2022 | Vukich | G01C 21/3446 |
| 2023/0111908 A1* | 4/2023 | Denninger | H04W 4/46 |
| | | | 701/23 |
| 2023/0125433 A1* | 4/2023 | Stenneth | G01C 21/3407 |
| | | | 701/25 |

OTHER PUBLICATIONS

Caceres, Noelia & Romero, Luis & Benitez, Francisco & Del Castillo, J.. (2012). Traffic Flow Estimation Models Using Cellular Phone Data. Intelligent Transportation Systems, IEEE Transactions on. 13. 1430-1441. 10.1109/TITS.2012.2189006.

* cited by examiner

TRAFFIC PREDICTION AND ROUTING USING TRAIN MOVEMENT PATTERNS

FIELD

The present application relates to traffic prediction and routing and more particularly to improved traffic prediction and routing using predictive modeling to estimate travel times for road segments proximate to train crossings.

BACKGROUND

Disruptions in traffic occur when vehicles are prevented from crossing train tracks. Vehicles are prevented from crossing train tracks when a train is stopped on the train tracks blocking the roadway and for a period of time surrounding when a train crosses the roadway. Disruptions in traffic may be amplified when multiple train crossings are present in a geographic area such as a town or city. Further, disruptions in traffic on road segments may vary in duration and severity according to the road segment's location relative to a train crossing.

Trains may be divided into two primary categories; commuter trains and freight trains. While commuter trains often publish a schedule, it is difficult to aggregate this information into a global product. Freight trains often do not have a publicly available schedule, in part, because of security concerns. What is needed is a system to predict and manage disruptions on road segments in response to trains regardless of the applicability of a schedule for various trains in the area.

SUMMARY

The following embodiments provide for vehicle routing and navigation using predictive modeling to estimate travel times for road segments proximate to train crossings.

In one embodiment, a method for estimating a travel time includes obtaining a movement pattern for a train, determining one or more predicted times when the train will be present at a train crossing where a road path and a train path intersect using the movement pattern, obtaining vehicle historical data including an average time for a vehicle to travel one or more road segments adjoining the train crossing, obtaining a start time, and calculating the travel time for the one or more road segments based on the vehicle historical data, the start time, and the predicted time when the train will be present at the train crossing.

In one embodiment, an apparatus for defining a model to estimate a travel time includes a communication interface configured to receive a plurality of global positioning system (GPS) coordinates for mobile devices monitored over time, a map including a train path and a road path the train path and road path intersecting at a train crossing, and vehicle historical data including an average time to travel one or more road segments adjoining the train crossing. The apparatus for defining a model to estimate a travel time according to this embodiment further includes a memory configured to store the plurality of GPS coordinates, the map, the vehicle historical data, and a model and a processor configured to access the memory and determine a movement pattern for a train using the plurality of GPS coordinates collected over time and the map.

In one embodiment, an apparatus for estimating a travel time includes a communication interface configured to receive a location of a train crossing where a road path and a train path intersect, the identity of one or more road segments adjoining the train crossing to be traveled, a direction of travel, and a start time, a memory configured to store the location of the train crossing, the identity of the one or more road segments, the direction traveled, the start time, and a trained model, and a neural network module configured to calculate an estimated time to travel the one or more road segments using the trained model, the location of the train crossing, the one or more road segments, the direction traveled, and the start time.

BRIEF DESCRIPTION OF THE DRAWINGS

Exemplary embodiments of the present disclosure are described herein with reference to the following drawings.

DETAILED DESCRIPTION

Figure 1:
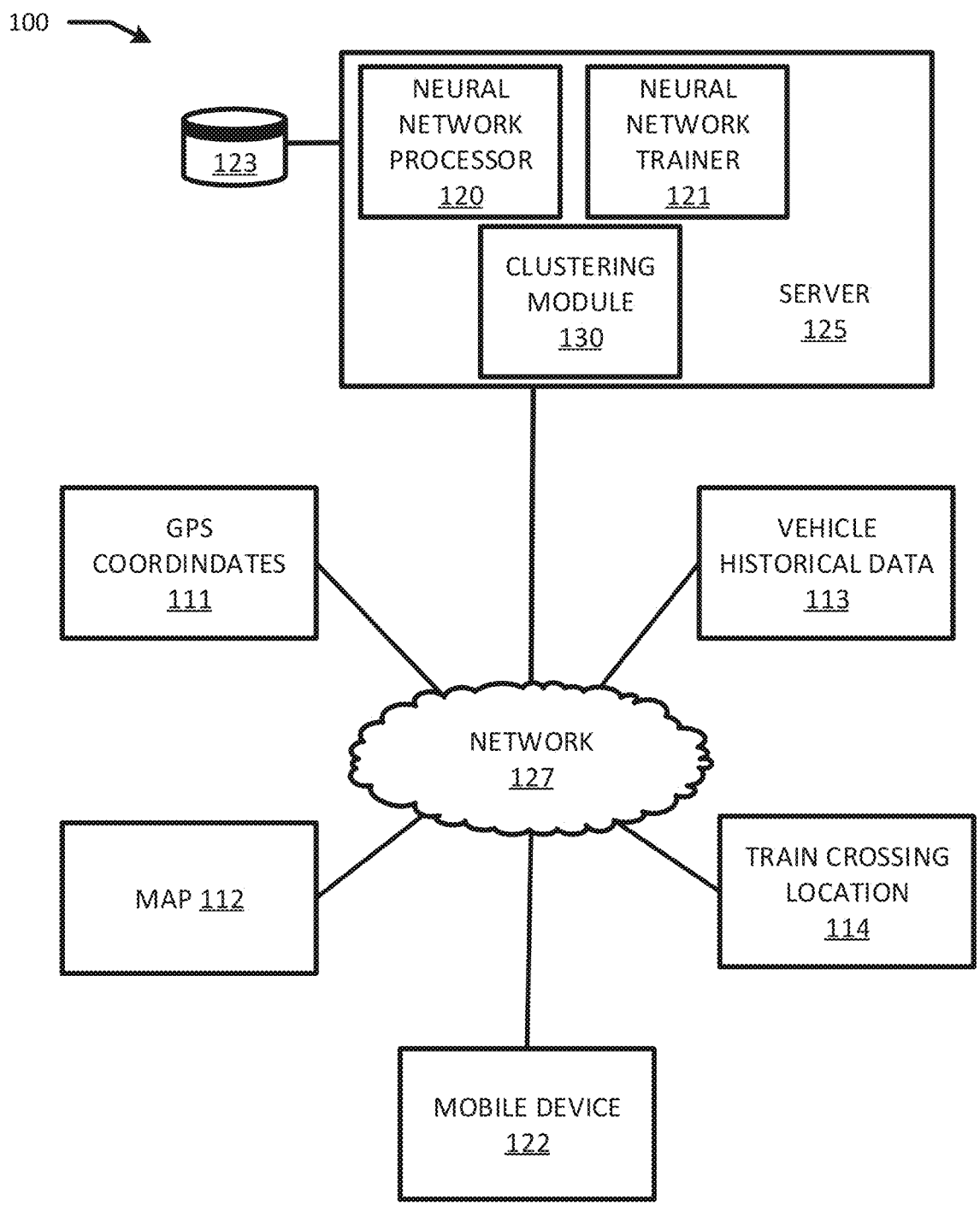
FIG. 1 illustrates a system for defining a model configured to calculate an estimated travel time and calculating an estimated travel time according to an exemplary embodiment of the present disclosure.

Disruptions in traffic caused by trains can significantly impact travel times on roadways proximate to train crossings. Specifically, travel times on roadways proximate to train crossing may change quickly and vary significantly in time periods after a train is present at the train crossing. Embodiments of the present disclosure relate to estimating travel times of road segments proximate to train crossings using movement patterns for trains. Travel times estimated using embodiments of the present disclosure may further be used in routing and navigation applications to minimize travel times.

Generally, in routing and navigation applications, a route is determined by dividing roads into a plurality of road segments. Roads may be divided into road segments by identifying intersections where two or more roads intersect and identifying portions of a road between two intersections as a road segment. In other words, intersections may be treated as nodes, and the portion of a road between the intersection may be treated as a road segment or link for routing and/or navigational purposes.

Various characteristics of the identified road segments (e.g., links) may be used to select a desired route. The road segments may be given a numerical value representing each of various characteristics associated with that road segment. For example, a value may be given for the speed limit on the road, the predicted amount of traffic on the road at a given time, the length of the road, and the like. For example, a link with a relatively high speed limit may be given a relatively low numerical value for speed limit and a link with a relatively low speed limit may be given a relatively high numerical value for speed limits. Further, a link that is relatively long (i.e., having a relatively large distance between two nodes) may be given a relatively high numerical value for road length and a link that is relatively short may be given a numerical value that is relatively small for road length.

In some examples, the numerical value representing some characteristics of the link will remain constant at all times. For example, a numerical value representing a speed limit of a link will not change unless the posted speed limit on that link changes. However, the numerical value representing other characteristics may change with respect to time. For example, a numerical value representing a predicted amount of traffic on a link at a given time may change with respect to the time at which the link is traveled.

Further, an algorithm or model may calculate a score being indicative of an estimated time to travel each of the links. The score may be calculated by assigning weights to each of the numerical values representing a characteristic of the link. Each of the numerical values and their respective weights may then be combined to obtain a score representing an estimated time to travel the link.

Finally, the routing or navigational application may look at each of the links and their associated scores and select a route from a starting point to a destination through all of the available links. For example, the routing or navigational application may select the route from starting point to destination in which the sum of the score for all the links traveled is the lowest, providing a route with the shortest estimated travel time.

FIG. 1 illustrates a system for defining a model configured to calculate an estimated travel time and calculating an estimated travel time according to an exemplary embodiment of the present disclosure. The system 100 for defining a model configured to calculate an estimated travel time and calculating an estimated travel time includes a server 125, including a neural network processor 120, a neural network trainer 121, and clustering module 130, connected to a system database 123 and a network 127. The network 127 is further connected to one or more sources including GPS coordinates 111, map 112, vehicle historical data 113 and train crossing location 114.

The GPS coordinates 111 include a plurality of GPS coordinates collected by a plurality of devices over time. The GPS coordinates 111 include the identity of the device that collected the coordinate and a time at which the coordinated was collected. In some embodiments the GPS coordinates 111 may come from a database, for example system database 123, that stores the plurality of GPS coordinates collected over time and the identity of the device that collected the coordinate. In other embodiments, the server may receive the GPS coordinates 111 from a plurality of devices (i.e., mobile devices) as the devices determine the GPS coordinates.

In some embodiments, the GPS coordinates 111 may be global navigation satellite system (GNSS) coordinates. The GPS coordinates 111 or GNSS coordinates may be collected by receiving GPS (or GNSS) signals and comparing the GPS (or GNSS) signals to a clock to determine the absolute or relative position of the device collecting the GPS or GNSS coordinates. The coordinate solution may derive accurate position estimates using a combination of GNSS signals and on-board sensors for improved performance.

In some embodiments, the GPS coordinates 111 may be position coordinates derived using another known method. For example, the GPS coordinates 111 may be location coordinates derived using a combination of GPS or GNSS coordinates and data from one or more motion sensors in the device. In some embodiments, the GPS coordinates 111 may be position coordinates derived using an inertial measurement unit (IMU).

The map 112 includes one or more train paths and one or more road paths and GPS coordinates for the one or more train paths and the one or more road paths. Further, in some embodiments, the map contains values assigned to one or more road segments on the road path adjoining a train crossing where a road path and a train path intersect. In some embodiments, the map 112 may further include information associated with the one or more road segments, such as a length of the one or more road segments and/or a speed limit for the one or more road segments. In some embodiments, map 112 may be stored on system database 123. In other embodiments, map 112 is accessible over network 127.

The vehicle historical data 113 includes average times for a vehicle to travel one or more road segments adjoining a train crossing on map 112. The vehicle historical data may include an average time to travel one or more road segments during a plurality of predetermined periods of time. For example, the vehicle historical data 113 may include an average time to travel a specific road segment during the time period between 8:00 AM and 8:30 AM. The vehicle historical data 113 may further include a different average time for a vehicle to travel the road segment between 8:30 AM and 9:00 AM. The vehicle historical data 113 may include an average time to travel the one or more road segments for any number of predetermined periods of time throughout the day. For example, the vehicle historical data 113 may include an average time to travel the one or more road segments for 10-minute time periods and may include 10-minute time periods accounting for every minute in a day. Further, the vehicle historical data 113 may further include predetermined time periods that are specific to a day of the week. For example, the vehicle historical data 113 may include an average time to travel a road segment between 10:15 AM and 10:30 AM on a Tuesday and a different average time to travel the same road segment at the same time on a Wednesday.

The train crossing location 114 contains the location (e.g., identity) of a train crossing through which a time for a vehicle to travel will be estimated. In some embodiments, the train crossing location 114 may be included in the map 112 and/or vehicle historical data 113. In other embodiments, the identity of a specific train crossing location may be received from a mobile device 122 connected to the network 127.

In some embodiments, the server 125 includes clustering module 130. The clustering module 130 may be configured to determine a movement pattern for a train using GPS coordinates 111 and map 112. In other embodiments, the movement pattern for a train is stored in system database 123 or is accessible via network 127.

In a first step, the clustering module 130 may determine a route or path traveled by a device. The clustering module may use the identity of the device to track the GPS coordinates collected by the identified device over time. The clustering module 130 may then determine a path traveled by the identified device using the GPS coordinates collected by the identified device over time. This may be done for each of the devices identified by the GPS coordinates, to determine a plurality of paths traveled by the devices over time.

In a second step, the clustering module 130 may match the plurality of defined paths to map 112. Map 112 includes both one or more train paths and one or more road paths. The clustering module may match the GPS coordinates in the paths traveled by the devices to the GPS coordinates of a train path on the map 112. The clustering module 130 may then determine which of the device paths follow the train path (i.e., have multiple GPS coordinates collected over time that match the GPS coordinates of the train path). The clustering module 130 may then isolate the device paths that follow the train path from all of device paths that do not follow the train path.

In a third step, the clustering module 130 may determine a movement pattern for a train. The clustering module 130 may then compile all of the GPS coordinates and the times at which they were collected from the device paths that follow the train path to determine a movement pattern for the train. In some embodiments, the movement pattern for a train may include specific predicted route and corresponding location of a train for each different day of the week. For example, the predicted location of a train may be different at the same time on two different days of the week.

The movement pattern for a train may include both previous known positions of the train and predicted locations of the train in the future. The movement pattern for the train may include predicted times at which a train will be at a specific location. In some embodiments, the clustering module 130 may determine the location of train stops by identifying GPS coordinates collected by devices that follow the train path that remain the same over a period of time.

Further, a predicted time at which a train will be present at a train crossing may be determined by identifying the location on map 112 where the train path and road path intersect and using the movement pattern for a train to predict a time at which the train will be present at the identified location.

In some embodiments, the server 125 may include a neural network processor 120 and a neural network trainer 121. In these embodiments, the server 125 may be configured to define the model using the neural network processor 120 and neural network trainer 121. The neural network trainer 121 may define the model using a movement pattern for a train, the map 112, and the vehicle historical data 113. The model may be configured to calculate an estimated time to travel one or more of the road segments using the movement pattern for a train, the map 112, the vehicle historical data 113, train crossing location 114, and start time 117. In some embodiments, the model is configured to calculate an estimated time to travel one or more of the road segments using the movement pattern for a train, the map 112, the vehicle historical data 113, train crossing location 114, start time 117, and road segment values 116.

The neural network trainer 121 may define the model using the GPS coordinates 111, map 112, and vehicle historical data 113. The GPS coordinates 111 may be used to determine previous locations of trains similarly to how the clustering module 130 determined a movement pattern for a train. The GPS coordinates 111 may be used to find devices following the train path at previous times. The paths of devices following the train path may then be used to determine when in the past a train was present at a crossing. This known time of when a train was present at a crossing may then be matched with the vehicle historical data 113 including known average times to travel the one or more road segments adjoining the crossing during periods of time proximate to the known time when a train was present at the crossing. The known time when a train was present at a crossing and the known average times to travel one or more road segments adjoining the crossing during time periods proximate to when the train was present at the crossing may be used to define a model configured to calculate an estimated time to travel one or more road segments adjoining a train crossing.

The neural network processor 120 may be configured to estimate a travel time for the one or more road segments using the model defined by the neural network trainer 121. In some embodiments, the neural network 120 may be configured to calculate an estimated time to travel across all of the road segments adjoining train crossings included in the vehicle historical data and the movement pattern for the train. In other embodiments, the neural network module 120 may be configured to calculate an estimated time to travel one or more identified road segments.

The server 125 may further include mapping and/or navigational applications that use the estimated travel time calculated by the model to select a route for a vehicle through the crossing.

In some embodiments, the neural network processor 120 and neural network trainer 121 may be included in mobile device 122. In this embodiment, mobile device 122 may be configured to communicate with network 127 to define a model configured to estimate a time to travel the one or more road segments and estimate a time to travel the one or more road segments using the defined model without server 125. In these embodiments, mobile device 122 may include system database 123 or system database 123 may be accessible via network 127.

In some embodiments, the neural network trainer 121 is further configured to define the model using road segment values 116. In these embodiments, the network is further connected to a source including road segment values.

The road segment values are values assigned to the one or more road segments adjoining the train crossing. The road segment values may be used to define the model configured to calculate an estimated time to travel the one or more road segments. The road segment values may be assigned to the one or more road segments adjoining the train crossing based on a position of the road segment relative to the train crossing. Each of the assigned values has a corresponding reliability factor. The road segment values and corresponding reliability factors are discussed in more detail with respect to the network graph for a train crossing illustrated in FIG. 3. In some embodiments, the road segment values may be included with the road segments on map 112. In some embodiments, values for specific road segments may be stored in system database 123. In other embodiments, the road segment values are accessible via network 127.

In some embodiments, the neural network processor is further configured to calculate an estimated travel time using road segment values, start time, the identity of one or more road segments, and/or a direction of travel. In these embodiments, the network 127 is further connected to one or more sources including road segment values, start time, the identity of one or more road segments, and/or a direction of travel.

The start time is a time that a vehicle will start traveling the one or more road segments adjoining a train crossing. In some embodiments, the system 100 may be configured to calculate an estimated travel time for the one or more road segments adjoining the train crossing at a specific time. In these embodiments, the system 100 uses the start time to calculate an estimated travel time for the one or more road segments.

The identity of one or more road segments is the identity of one or more road segments adjoining a train crossing. In some embodiments, the system 100 may be configured to calculate an estimated travel time for only one or more specific road segments. In these embodiments, an estimated travel time may only be calculated for the road segments for which the identity of the road segments is provided.

Figure 2:
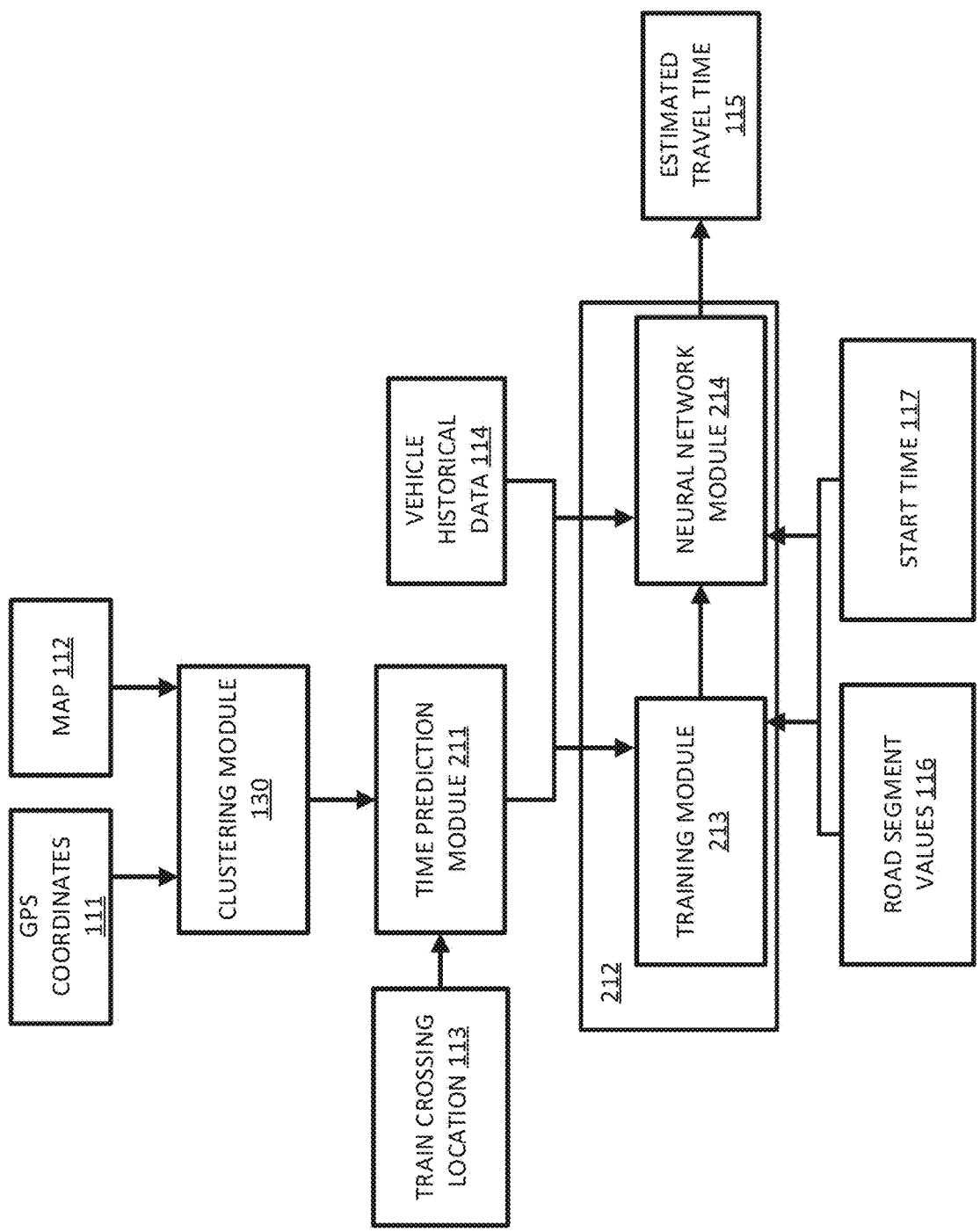
FIG. 2 illustrates a framework for defining a model configured to calculate an estimated travel time and for calculating an estimated travel time according to an exemplary embodiment of the present disclosure.

FIG. 2 illustrates a framework for defining a model configured to calculate an estimated travel time and for calculating an estimated travel time according to an exemplary embodiment of the present disclosure. The framework as illustrated in FIG. 2 includes GPS coordinates 111, map 112, vehicle historical data 113, and start time 117.

In some embodiments, the framework may further include train crossing location 114, road segment values 116, the identity of one or more road segments, and a direction of travel. The GPS coordinates 111, map 112, vehicle historical data 113, and train crossing location 114, road segment values 116, identity of one or more road segments, and direction of travel may be the same as those discussed above with respect to FIG. 1. Accordingly, a detailed description of these elements with respect to FIG. 2 is omitted.

In some embodiments, the framework of FIG. 2 includes clustering module 130. The clustering module 130 may be the same as the clustering module 130 discussed above with respect to FIG. 1. Accordingly, a detailed description thereof with respect to FIG. 2 is omitted.

The framework of FIG. 2 further includes time prediction module 211, travel time calculation module 212, including training module 213 and neural network module 214, and estimated travel time 115.

Time prediction module 211 is configured to predict a time when a train will be present at one or more train crossings using the movement pattern for the train and the map. In some embodiments, the time prediction module may receive the movement pattern for a train from clustering module 130. In other embodiments, time prediction module may receive the movement pattern for a train from a database storing the movement pattern for a train. In some embodiments, the time prediction module 211 may receive the map 112 with the train movement pattern. In other embodiments, the train prediction module 211 may receive the movement pattern for a train and the map 112 separately.

In some embodiments, the time prediction module 211 may predict all of the times when a train will be present at all of the train crossings along the movement pattern for the train and on map 112. In other embodiments, the time prediction module 211 may receive the train crossing location 114 and determine predicted times when the train will be present at the specified crossing using the train movement pattern.

The travel time calculation module 212 includes training module 213 and neural network module 214. The travel time calculation module 212 is configured to define a model configured to calculate an estimated travel time and to calculate an estimated travel time using the defined model.

Training module 213 is configured to define a model configured to calculate an estimated travel time for one or more road segments adjoining a train crossing. The training module 213 may define the model using the movement pattern for a train and the vehicle historical data 113. In some embodiments, the training module 213 may define the model using the movement pattern for a train, the vehicle historical data 113 and the map 112. In some embodiments, the training module may define the model using the movement pattern for a train, the vehicle historical data 113, the map 112, and the reliability factor corresponding to the values assigned to the one or more road segments (i.e., road segment values 116). Training module 213 receives previous locations of the train at specific times included in the movement pattern for the train. The previous locations of a train at specific times include the specific times at which a train was previously at one or more train crossings. Training module 213 receives vehicle historical data 113. The vehicle historical data 113 includes an average time to travel one or more road segments adjoining one or more train crossings. The movement pattern for a train and the vehicle historical data can be matched to one another to determine the average time to travel one or more road segments adjoining a specific train crossing at specific times surrounding a time when a train is present at the specific crossing. In some embodiments, the map 112 may be used to match the movement pattern for the train and the vehicle historical data 113. In other embodiments, the movement pattern for a train and/or the vehicle historical data 113 may include map 112.

The training module 213 defines a model configured to calculate an estimated travel time for one or more road segments adjoining a train crossing using the movement pattern for a train and the vehicle historical data 113. In some embodiments, training module 213 may define a model configured to estimate a travel time for one or more road segments adjoining a crossing using the movement pattern for a train, the vehicle historical data 113 and map 112.

In some embodiments, the defined model may include the movement pattern for a train (i.e., the model is defined using the movement pattern for the train and the model learns the movement pattern for the train). In other embodiments, the defined model may not include the movement pattern for a train and a movement pattern for a train and/or a corresponding predicted time that a train is present at a train crossing must be input into the defined model to calculate an estimated travel time.

In some embodiments, the defined model may include the vehicle historical data 113 (i.e., the model is defined using the vehicle historical data 113 and the model learns the vehicle historical data 113). In other embodiments, the defined model does not include the vehicle historical data 113 and vehicle historical data 113 must be input into the defined model to calculate an estimated travel time.

In some embodiments, the training module 213 may further receive road segment values 116 assigned to one or more road segments adjoining the crossing and reliability factors corresponding to the values assigned to the one or more road segments. In some embodiments, the road segment values 116 and their corresponding reliability factors may be used in addition to the movement pattern for the train and the vehicle historical data 113 to define a model configured to estimate the travel time for one or more road segments adjoining the train crossing.

In some embodiments, the defined model may be configured to only use the reliability factors corresponding to the road segment values when a start time 117 to travel the one or more road segments adjoining the train crossing is within a predetermined window of time surrounding when a time is predicted to be present at the train crossing.

The neural network module 214 is configured to calculate an estimated travel time 115 for one or more road segments adjoining a train crossing using the defined model.

In some embodiments, the neural network module 214 may calculate an estimated travel time using the defined model and a start time 117. In these embodiments, the defined model may include the movement pattern for the train and the vehicle historical data 113. Further, in these embodiments, the neural network module may calculate an estimated travel time 115 for all of the road segments along the movement pattern for a train for which the model includes vehicle historical data 113.

In other embodiments, the neural network module 214 may calculate an estimated travel time using the defined model, the start time 117, and the movement pattern for a train or the vehicle historical data. In these embodiments, the defined model includes the movement pattern for a train or the vehicle historical data 113. In these embodiments, the neural network module 214 may calculate an estimated travel time 115 for all of the road segments along the movement pattern for a train for which the model includes vehicle historical data 113.

In some embodiments, the neural network module 214 is configured to calculate an estimated time to travel the one or more road segments using the model, the train crossing location 114, the identity of one or more road segments, the direction of travel, the start time 117, and the reliability factors corresponding to the road segment values 116. In some embodiments, the neural network module 214 may only use the reliability factors associated with the road segment values 116 if the model determines that a train is predicted within a predetermined window of time surrounding the start time 117.

In some embodiments the neural network module 214 may receive a crossing location 114. In these embodiments, the neural network module 214 may calculate an estimated travel time 115 for all of the road segments adjoining the train crossing identified using crossing location 114.

In some embodiments, the neural network module 214 may receive the identity of one or more road segments adjoining a train crossing. In these embodiments, the neural network module 214 may calculate an estimated travel time 115 for the road segments identified by the identity of the one or more road segments.

In some embodiments, the neural network module 214 may determine a duration of time in which the average time to travel the one or more road segments is increased from an average time to travel the one or more road segments when no trains have been present for a predetermined interval of time. The predetermined interval of time may be an interval of time sufficiently long so that there is no impact of the presence of a train at the crossing on the average time to travel the one or more road segments after the predetermined interval of time.

In some embodiments, the neural network module 214 may determine an amount of time by which the average time to travel the one or more road segments increases after a train is present at the train crossing from an average time to travel the one or more road segments when no trains have been present at the train crossing for a predetermined interval of time.

In some embodiments, the neural network module 214 may determine an amount of time by which the average time to travel the one or more road segments having a specific assigned value (road segment value 116) increases after a train is present at the train crossing from an average time to travel the one or more road segments when no trains have been present at the train crossing for a predetermined interval of time.

In some embodiments, the travel time calculation may include only the neural network trainer 213 or only the neural network module 214. Accordingly, the framework of FIG. 2 may be used only to define a neural network configured to calculate an estimated travel time 115 for one or more road segments adjoining a train crossing or to use a defined model to calculate an estimated travel time 115 for one or more road segments adjoining a train crossing.

In some embodiments, the neural network module 214 may calculate a score representing the estimated time to travel the one or more road segments adjoining the train crossing. The neural network module 214 may use the model defined by the training module 213 to calculate a score representing the estimated time to travel the one or more road segments. The neural network module 214 may calculate the travel time for one or more road segments by calculating a score representing an estimated time to travel the one or more road segments using the vehicle historical data 113, the start time 117, and a predicted time when a train will be at the train crossing.

In some embodiments, the training module 213 and the neural network module 214 may be configured to compare one or more predicted times (when a train will be present at a crossing) with a start time to determine an intervening time, the intervening time being a smallest amount of time between the start time and the one or more predicted times. The vehicle historical data 113 may include an average time to travel the one or more road segments during a time period after the train is present at the train crossing including the intervening time.

In some embodiments, the reliability factor associated with a road segment value 116 may be used by the neural network module 214 to calculate a score representing the estimated time to travel the one or more road segments. In some embodiments, the neural network module 214 determine in the intervening time is less than a predetermined window of time surrounding the one or more predicted times. If the intervening time is less than the predetermined window of time, the score representing an estimated time to travel each of the one or more road segments may further include the reliability factor corresponding to the assigned value of the road segment.

In some embodiments, the neural network module 214 may further be configured to select a route through the train crossing, the route being comprised of one or more of the road segments adjoining the train crossing. In some embodiments, the neural network module 214 may select a route through the train crossing using the score representing an estimated time to travel the one or more road segments. In some embodiments, the neural network module may identify and select a route through the train crossing including the road segments having the smallest combined score representing an estimated time to travel through the one or more road segments.

Figure 3:
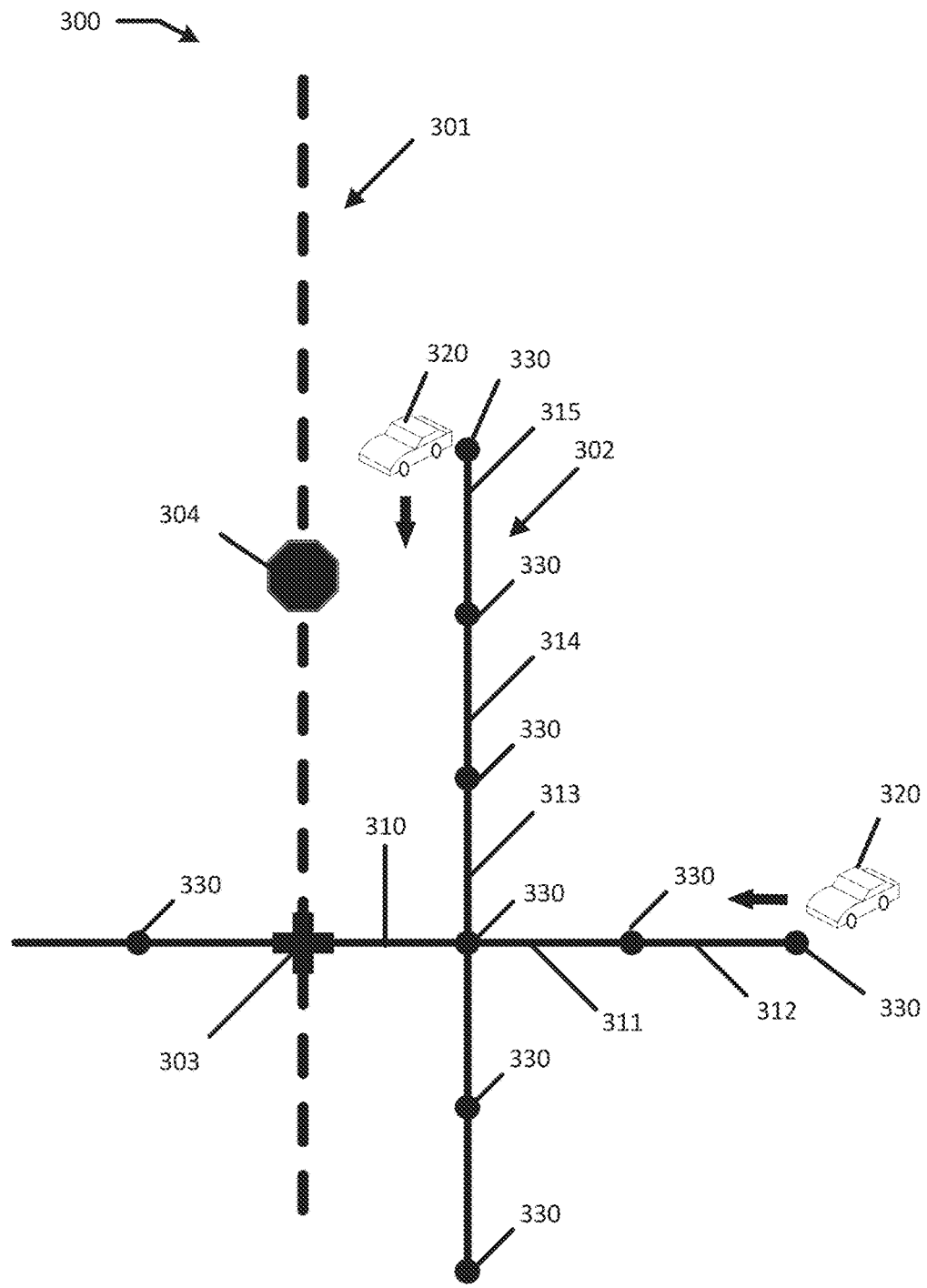
FIG. 3 illustrates a network graph for a train crossing according to an exemplary embodiment of the present disclosure.

FIG. 3 illustrates a network graph 300 for a train crossing according to an exemplary embodiment of the present disclosure. The network graph 300 illustrates a train crossing 303 where a train path 301 and a road path 302 intersect. The network graph 300 further includes a train stop 304 located on the train path 301, vehicle 320, and road segments 311, 312, 313, 314, 315, and 316.

Road path 302 includes roads that may be traveled by one or more vehicles 320. The road path 302 may include one or more different roads (e.g., streets) and includes intersections 330 where two or more roads meet.

The road segments 310, 311, 312, 313,314, 315, and 316 are portions of the road path 302. Each of the road segments 310, 311, 312, 313, 314, 315, and 316 either adjoin the train crossing 303 or adjoin one or more other road segments that adjoin the train crossing.

In some embodiments, the road segments 310, 311, 312, 313, 314, 315, and 316 represent the portions of roads between intersections 330. In other words, each intersection 330 on the road path 302 may be treated as a node. The road segment may then be the portion of a road between the two intersections (i.e., a link between two nodes).

In other embodiments, the road segments may represent portions of road that are a predetermined road distance away from the crossing 303. For example, a road segment may be 0-200 meters away from the crossing and a subsequent road segment may be 200-300 meters away from the crossing 303.

In some embodiments, values are assigned to the one or more road segments adjoining the crossing based on a position of the road segment relative to the train crossing. The values assigned to the road segments may be based on the position of the road segment relative to the crossing including a distance from the crossing to the road segment.

For example, in one embodiment, a road segment directly adjoining the train crossing may be assigned a value of "0". As illustrated in FIG. 3, road segment 310 directly adjoins crossing 303 and therefore may be assigned a value of "0". Further, a road segment that directly adjoins a road segment that directly adjoins the crossing 303 (i.e., a road segment that has exactly one other road segment between it and the train crossing) may be assigned a value of "1". As illustrated in FIG. 3, road segments 311 and 313 have exactly on other road segment (road segment 310) between them and crossing 303 and therefore may be assigned a value of "1". Further, as illustrated in FIG. 3, using the same logic road segments 312 and 314 may be assigned a value of "2" as there are exactly two road segments between them and train crossing 303. Further, road segment 315 may be assigned a value of "3" as there are exactly three road segments between road segment 315 and crossing 303.

In another embodiment, values may be assigned to road segment based on the distance from the crossing to the road segment. For example, a road segment directly adjoining the crossing and spanning from 0-200 meters from the train crossing may be assigned a value of "0". Additional road segments adjoining the first road segment and spanning from 200-400 meters from the train crossing may be assigned a value of "1". Additional road segments even further away from the train crossing may be assigned values using this same method, for example a road segment spanning 400-600 meters from the train may be assigned a value of "2".

In some embodiments, each of the assigned values includes a corresponding reliability factor. Accordingly, the reliability factor, like the assigned value may be based on the position of the road segment relative to the train crossing 303 and/or the distance between the train crossing and the road segment.

The corresponding reliability factor may be the same for all assigned values having the same value. For example, all assigned road segments assigned a value of "0" may have a reliability factor of, for example 1.4. In some embodiments, the reliability factor is a numerical value representing the influence of the presence of a train at the crossing on the road segment. In other embodiments, the reliability factor may be a numerical value representing the unpredictability of traffic during a time period surrounding when a train is predicted to arrive at the crossing. In some embodiments, the reliability factor is both a numerical value representing the influence of the presence of a train at the crossing on the road segment and a numerical value representing the unpredictability of traffic during a time period surrounding when a train is predicted to arrive at the crossing.

In some embodiments, a relatively high reliability factor may be assigned to road segments that are directly adjoining train crossing 303. It may be determined that an average time to travel a road segments directly adjoining a train crossing is most influenced by the presence of a train at the train crossing. Accordingly, the highest reliability factor may be assigned to road segments directly adjoining the train crossing 303. In some embodiments, the reliability factors assigned to road segments may decrease as the road segments become further away from the train crossing. For example, as illustrated in FIG. 3, road segment 310 may have the highest reliability factor. Further road segment 313 may have a higher reliability factor than road segments 312 and 314 because there are less road segments between road segment 312 and the train crossing than there are road segments between both road segments 312 and 314 and the crossing 303.

The reliability factor may be used when calculating a score estimating the amount of time to travel one or more of the road segments adjoining the crossing. For example, in some embodiments, when a start time for a vehicle to start traveling one of the road segments 311, 312, 313, 314, and 315 adjoining the train crossing 303 is within a predetermined window of time before or after a predicted time when a train will be present at the crossing, the reliability factor may be used in calculating a score representing the estimated average time to travel the road segment.

Figure 4:
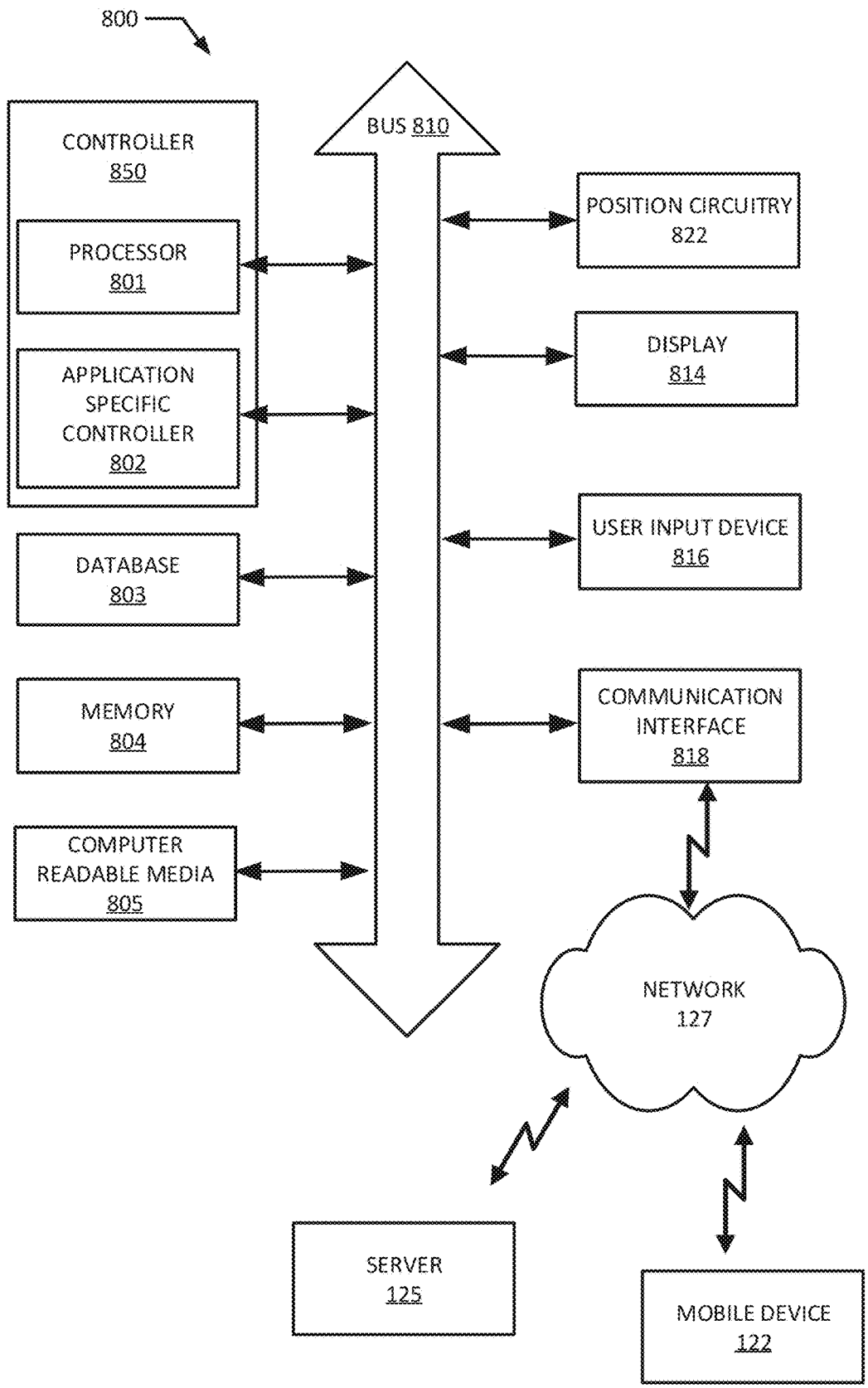
FIG. 4 illustrates an apparatus for defining a model configured calculate an estimated travel time and for calculating an estimated travel time according to an exemplary embodiment of the present disclosure.

FIG. 4 illustrates an apparatus 800 for defining a model configured to calculate an estimated travel time and for calculating an estimated travel time according to an exemplary embodiment of the present disclosure. The apparatus 800 includes a bus 810 facilitating communication between a controller 850 that may be implemented by a processor 801 and/or application specific controller 802, which may be referred to individually or collectively as the controller 850, and one or more components including a database 803, a memory 804, a computer readable medium 805, and a communication interface 818. The contents of the database 803 are described with respect to system database 123. The communication interface 818 may be connected to network 127, which may be the internet.

In some embodiments, the network 127 may be connected to a server 125. In some embodiments, the network 127 may be connected to one or more mobile devices 122. In some embodiments, the network 127 may be connected to system database 123.

The communication interface 818 may include any operable connection. An operable connection may be one in which signals, physical connections and/or logical communications may be sent and/or received. An operable connection may include a physical interface, an electrical interface, and/or a data interface. The communication interface 818 provides for wireless and/or wired communications in any known or later developed format. The communication interface 818 may be connected to the internet and/or other networks. The communication interface 818 may be configured to receive the GPS coordinates 111, map 112, vehicle historical data 113, train crossing location 114, road segment values 116, start time 117, the identity of one or more road segments, a direction of travel and/or a movement pattern for the train. In some embodiments, the communication interface 818 may receive the GPS coordinates 111, map 112, vehicle historical data 113, train crossing location 114, road segment values 116, start time 117, the identity of one or more road segments, a direction of travel, and/or a movement pattern for the train via the network 127. In some embodiments, the communication interface 818 may be further configured to receive a model for calculating an estimated travel time. The communication interface 818 may be configured to receive the values assigned to one or more road segments (i.e., road segment values 116) and the reliability corresponding to the assigned values.

The controller 850 may receive the GPS coordinates 111, map 112, vehicle historical data 113, train crossing location 114, road segment values 116, start time 117, the identity of one or more road segments, a direction of travel, and/or a movement pattern for the train from the communication interface. The controller 850 may store the GPS coordinates 111, map 112, vehicle historical data 113, train crossing location 114, road segment values 116, start time 117, the identity of one or more road segments, a direction of travel and/or a movement pattern for the train in the database 803 and/or memory 80 for analysis. The controller 850 may access the database 803 and/or memory 804 and retrieve the GPS coordinates 111, map 112, vehicle historical data 113, train crossing location 114, road segment values 116, start time 117, the identity of one or more road segments, the direction of travel, and/or a movement pattern for the train. In some embodiments, the controller 850 may further be configured to receive a model for calculating an estimated travel time, store the model for calculating an estimated travel time in the database 803 and/or memory 804, and access the database 803 and/or memory to retrieve the model for calculating an estimated travel time.

The GPS coordinates 111, map 112, vehicle historical data 113, train crossing location 114, road segment values 116, start time 117, the identity of one or more road segments, the direction of travel and/or a movement pattern for the train may be stored in the database 803 and/or memory 804. The database 803 and/or memory 804 may be configured to store the values assigned to the one or more road segments (i.e., road segment values 116) and the reliability factors corresponding with the assigned values.

The memory 804 may be a volatile memory or a non-volatile memory. The memory 404 may include one or more read only memory (ROM), random access memory (RAM), a flash memory, an electronic erasable program read only memory (EEPROM), or other type of memory. The memory 804 may be removable from the apparatus 800, such as a secure digital (SD) memory card.

The memory 804 and/or the computer readable medium 805 may include a set of instructions that can be executed to cause the controller to perform any one or more of the methods or computer-based functions disclosed herein. For example, controller 850 may determine a movement pattern for a train (using clustering module 130). The controller 850 may predict a time when a train will be present at a train crossing (using time prediction module 211). The controller 850 may define a model configured to calculate an estimated timed (using training module 213). The controller 850 may calculate an estimated time to travel one or more road segments (using neural network module 214). The controller may determine a route through a train crossing using the calculates estimated travel times for the one or more road segments (using neural network module 214).

The controller 850 may be operable to allow a user to access on or more navigational or routing applications on apparatus 800. For example, to controller may be operable to allow a user to input o select on or more destinations. The controller 850 may further be operable to allow a user to view available routes to the one or more destinations, including estimated travel times for the one or more routes. The controller 850 may be operable to allow a user to select one of the routes provided by the navigational or routing application. The controller 850 may be operable to provide the user directions along a selected route through the navigational or routing application.

A user may use the display 814 and user input device 816 of the apparatus 800 to interact with one or more navigational or routing applications. The display 814 may comprise a screen and the user input device may comprise one or more buttons on the apparatus 800. In some embodiments, the display 814 and user interface may comprise a touch sensitive surface (i.e., a touch screen).

In some embodiments, the apparatus 800 may include position circuitry 822. The position circuitry 822 may collect global navigation satellite system (GNSS) location data of the apparatus 800. The position circuitry may generate GNSS location data by receiving GNSS signals and comparing them to a clock to determine a position of the apparatus 800. In these embodiments, the GNSS location data of the apparatus 800 may be used by a navigational and/or routing application as an apparatus 800 location and/or a starting location for a route.

Figure 5:
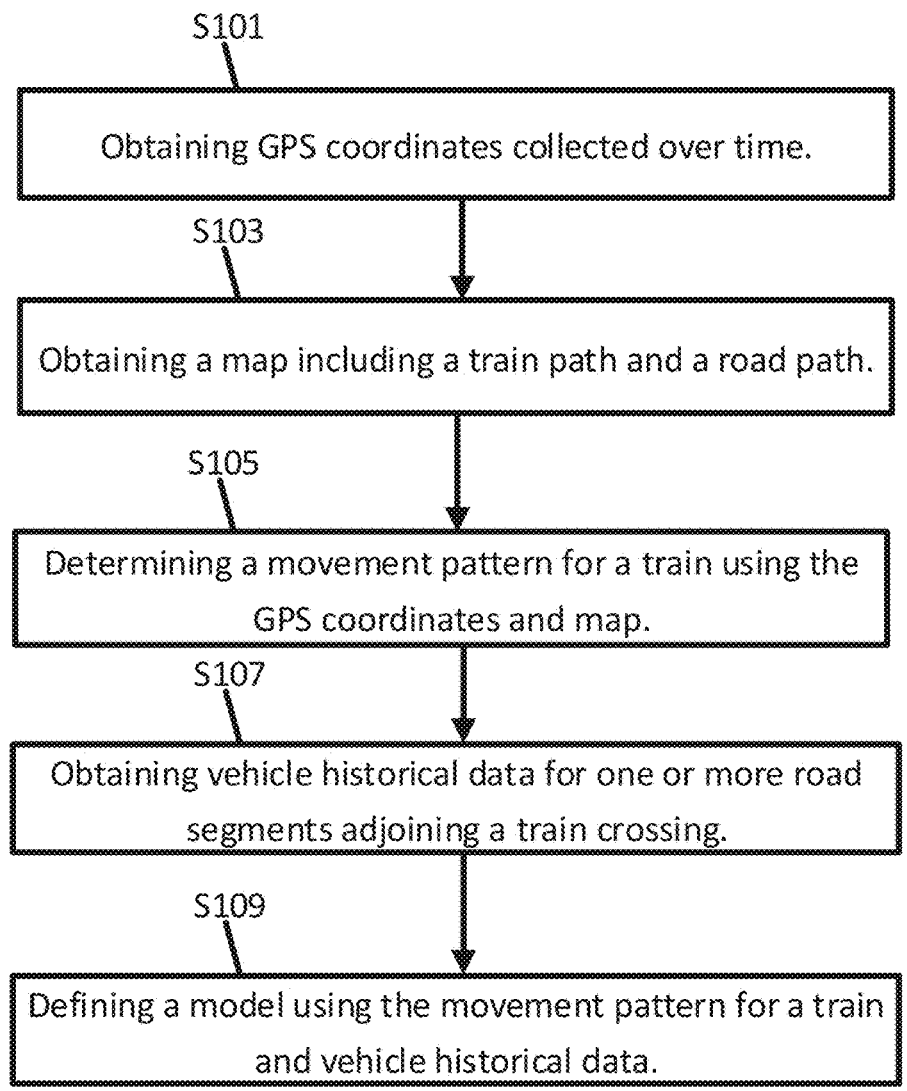
FIG. 5 illustrates an example flow chart for defining a model configured to calculate an estimated travel time according to an exemplary embodiment of the present disclosure.

FIG. 5 illustrates an example flow chart for defining a model to estimate a travel time according to an exemplary embodiment of the present disclosure. The various systems and apparatuses disclosed herein may employ the method of FIG. 4. Additional, different, or fewer acts may be provided.

At act S101, the system or apparatus obtains GPS coordinates 111 collected over time. In some embodiments, the system or apparatus may be connected to a network (e.g., the internet) and the system or apparatus may obtain the GPS coordinates 111 via communication over the network. In some embodiments, the GPS coordinates 111 may be stored in memory and/or a database within the system or apparatus.

At act S103, the system or apparatus obtains a map 112 including a train path and a road path. In some embodiments, the system or apparatus may be connected to a network (e.g., the internet) and the system or apparatus may obtain the map 112 via communication over the network. In some embodiments, the map 112 may be stored in memory and/or a database within the system or apparatus.

At act S105, the clustering module 130 determines a movement pattern for a train using the GPS coordinates 111 and the map 112. The clustering module 130 determines a movement pattern for a train as discussed above with reference to FIG. 1. In some embodiments, the clustering module 130 may determine a movement pattern for a train that is the same each day. In other embodiments, the clustering module 130 may determine a movement pattern for a train specific to each day of the week.

At act S107, the system or apparatus receives vehicle historical data 113 for one or more road segments adjoining a train crossing. The vehicle historical data 113 may be the same as the vehicle historical data 113 discussed with respect to FIG. 1. In some embodiments, the vehicle historical data 113 includes map 112. The system or apparatus obtains vehicle historical data 113 for road segments that surround the train path for which the system or apparatus has obtained a movement pattern for a train. In some embodiments, the system or apparatus may be connected to a network (e.g., the internet) and the system or apparatus may obtain the vehicle historical data 113 via the network. In some embodiments the vehicle historical data 113 may be stored in memory and/or a database within the system or apparatus.

At act S109, the training module 213 defines a model configured to calculate an estimated travel time of the one or more road segments adjoining a train crossing using the movement pattern for a train and the vehicle historical data 113. The training module 213 may receive the movement pattern for a train from the clustering module 230. The training module 213 is configured to define the model using the movement pattern for a train and the vehicle historical data 113. The training module 213 may input the movement pattern for a train and the vehicle historical data 113 into the model to understand the influence of the presence of a train at a crossing on the average time to travel one or more road segments adjoining the train crossing during various time periods after the train is present at the crossing. The embeddings of the average times to travel one or more road segments adjoining a train crossing during periods of time after a train is present at the train crossing may be used to define the model.

In some embodiments, a model configured to calculate an estimated travel time may further be defined using road segment values 116 assigned to the one or more road segments adjoining a train crossing. In some embodiments, the road segment values 116 may be included in the vehicle historical data. In other embodiments, the road segment values 116 may be included in map 112. In other embodiments, the road segments may be identified, and the system or apparatus may receive the road segment values 116 from a database or via a network. In these embodiments, the model is further defined using the road segment values to understand the impact of the presence of a train on the average time to travel one or more road segments having a specific assigned value during various time periods after a train is present at the train crossing. In these embodiments, road segment values may be used as an input when the defined model is used to calculate an estimated travel time for the one or more road segments.

Figure 6:
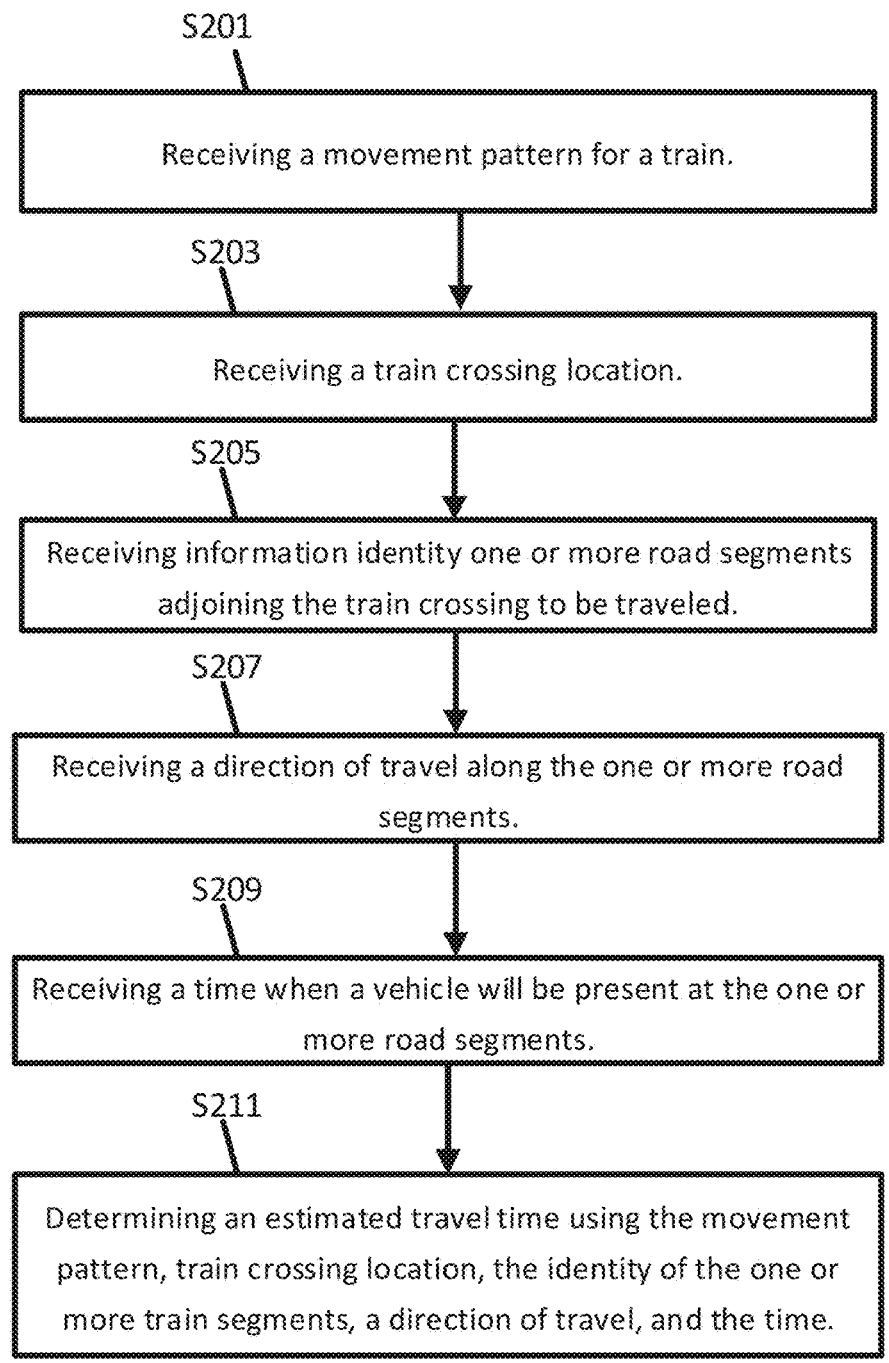
FIG. 6 illustrates an example flow chart for calculating an estimated travel time according to an exemplary embodiment of the present disclosure.

FIG. 6 illustrates an example flow chart for calculating an estimated travel time according to an exemplary embodiment of the present disclosure. The various systems and apparatuses disclosed herein may employ the method of FIG. 6. Additional, different, or fewer acts may be provided.

At act S201, the system or apparatus receives a movement pattern for a train. In some embodiments, the system or apparatus may be connected to a network 127 (e.g., the internet) and the system or apparatus may receive the movement pattern for a train via communication over the network. In some embodiments the movement pattern for a train may be stored in a memory and/or a database within the system or apparatus.

In some embodiments the system or apparatus may include a clustering module 130. In these embodiments, the system or apparatus may receive GPS coordinates 111 and map 112. In these embodiments, the clustering module 130 may determine the movement pattern of the train using the GPS coordinate 111 and the map 112 as discussed above with respect to the Figure of claim 1. In these embodiments, the train movement pattern may be received from clustering module 130.

At act S203, the system or apparatus obtain the train crossing location 114. In some embodiments, the system or apparatus may be connected to a network (e.g., the internet) and the system or apparatus may obtain the train crossing location 114 via communication over the network.

At act S205, the system of apparatus receives the identity of one or more road segments adjoining the train crossing. In some embodiments, the system or apparatus may be connected to a network (e.g., the internet) and the system or apparatus may obtain the identity of the one or more road segments via communication over the network. In some embodiments, the identity of the one or more road segments may be stored in memory and/or a database within the system of apparatus.

At act S207, the system of apparatus receives a direction of travel. In some embodiments, the system or apparatus may be connected to a network (e.g., the internet) and the system or apparatus may obtain the direction of travel via communication over the network. In some embodiments, the direction or travel may be determined by a navigational or routing application operable on the system or apparatus.

At act S209, the system or apparatus receives a start time 117. In some embodiments, the system or apparatus may be connected to a network (e.g., the internet) and the system or apparatus may obtain the start time 117 via communication over the network. In some embodiments, the start time 117 may be determined by a navigational or routing application operable on the system or apparatus.

At act S211, the neural network module 214 calculates an estimated time to travel one or more road segments adjoining a crossing using the movement pattern for the train, the train crossing location 114, the identity of the one or more road segments, a direction of travel, and the start time 117.

In some embodiments, the system or apparatus may not receive a train crossing location 114 and/or the identity of one or more road segments. In these embodiments, the system or apparatus may use the defined model to calculate an estimated travel time for all of the road segments adjoining train crossings included in the movement pattern for a train and vehicle historical data 113.

In some embodiments, the system or apparatus may further receive road segment values 116 assigned to one or more road segments adjoining a crossing. In these embodiments, the model may be defined using the road segment values 116 and the estimated time to travel one or more road segments may be calculated using the road segment values.

In some embodiments, the system or apparatus may be further configured to identify and select a route through one or more road segments adjoining a train crossing using the estimated travel times of the one or more road segments. In these embodiments, the system or apparatus may select a route navigating a user through the train crossing consisting of the one or more road segments having the smallest combined estimated travel time.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable medium suitable for storing computer program instructions and data include all forms of non-volatile memory, medium and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple medium, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor medium, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other The descriptions and illustrations of the embodiments provided herein are intended to provide a general understanding of the structure of the various embodiments. The descriptions and illustrations are not intended to serve as a complete description of all of the elements and features of apparatuses and systems that utilize the structure or methods described herein. Many other embodiments may be apparent to those having ordinary skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other portions may be minimized. Accordingly, the disclosure and the figures are to be regarded as illustrative rather than restrictive.

While this specification contains many specifics, these should not be constructed as limitations on the scope of the present inventive concept or of what may be claimed, but rather as descriptions of features specific to particular embodiments of the inventive concept. Certain features that are disclosed herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various systems components in the embodiments described above should not be understood as requiring such separation in all embodiments.

When a component, device, element, or the like of the present disclosure is described as having a purpose or performing an operation, function, or the like, the component, device, or element should be considered herein as being "configured to" meet that purpose or to perform that operation or function.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. The disclosure is intended to cover any and all subsequent adaptations or variations of various embodiments. Combinations of the above embodiments, and other embodiments not specifically described herein, are apparent to those of skill in the art upon reviewing the disclosure.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An apparatus for defining a model to estimate a travel time, the apparatus comprising:
    a communication interface configured to receive a plurality of global positioning system (GPS) coordinates for mobile devices monitored over time, a map including a train path and a road path the train path and road path intersecting at a train crossing, vehicle historical data including an average time to travel one or more road segments adjoining the train crossing;
    a memory configured to store the plurality of GPS coordinates, the map, the vehicle historical data, and a model; and
    a processor configured to access the memory and determine a movement pattern for a train, and match the movement pattern for the train with the GPS coordinates for the mobile devices collected over time using the map,
    wherein the communication interface is further configured to receive values assigned to the one or more road segments adjoining the train crossing based on a position of the road segment relative to the train crossing wherein each of the assigned values has a corresponding reliability factor,
    wherein the model is further configured to select a route through the train crossing with a minimized travel time, the route including one or more of the road segments adjoining the train crossing, and
    wherein the model is defined using the movement pattern for a train, the vehicle historical data, and the reliability corresponding to the values assigned to the one or more road segments.

2. The apparatus of claim 1, wherein the model is further defined using the map.

3. The apparatus of claim 1, wherein the model is further configured to select a route through a train crossing including the road segments having the shortest combined estimated travel time.

4. The apparatus of claim 1, wherein the model is further configured to only use the reliability factors corresponding to the road segments when a start time to travel the one or more road segments adjoining the train crossing is within a predetermined window of time surrounding when a time is predicted to be present at the train crossing.

5. The apparatus of claim 1, wherein the model if further configured to determine a duration of time in which the average time to travel the one or more road segments is increased from an average time to travel the one or more road segments when no trains have been present for a predetermined interval of time.

6. The apparatus of claim 5, wherein the predetermined interval of time is an interval of time sufficiently long so that there is no impact on a presence of a train at the crossing on the average time to travel the one or more road segments after the predetermined interval of time.

7. The apparatus of claim 1, wherein the model is further configured to receive train crossing locations and calculate an estimated travel time for the road segments adjoining the train crossing locations.

8. The apparatus of claim 1 further comprising a controller configured to perform a function of the model.

9. The apparatus of claim 8 wherein the controller is further configured to calculate an estimated time to travel one or more segments using a neural network module.

10. The apparatus of claim 9 wherein the controller is further configured to determine a route through a train crossing using the calculated estimated travel time for the one or more road segments.

11. The apparatus of claim 8 wherein the controller is further configured to allow a user to select one or more destinations.

12. The apparatus of claim 11, wherein the controller is further configured to allow the user to view available routes to the one or more destinations and view the estimated travel time for the one or more routes.

13. The apparatus of claim 1, further comprising a display configured to allow a user to interact with one or more navigational applications.

14. The apparatus of claim 1, further comprising position circuitry configured to collect global navigation satellite system location data of the apparatus.

15. The apparatus of claim 1, further comprising a neural network module wherein the processor is configured to calculate an estimated travel time for the one or more road segments using the model, a location of the train crossing, an identity of the one or more road segments, a direction of travel, and a start time.

16. The apparatus of claim 15, wherein the neural network module is processor is configured to estimate the travel time using the model, the location of the train crossing, the identity of the one or more road segments, the direction of travel, the start time, and the reliability factors corresponding to the values assigned to the one or more road segments.

17. The apparatus of claim 1, wherein the communication interface is configured to be connected to a network, wherein the network is connected to a server.

18. The apparatus of claim 1, wherein the communication interface is further configured to receive a location of a train crossing where a road path and a train path intersect, an identity of one or more road segments adjoining the crossing, a direction of travel, and a start time.

19. The apparatus of claim 1, wherein the memory is further configured to store the assigned values and reliability factors.

* * * * *